United States Patent
Raina et al.

(10) Patent No.: US 9,633,493 B2
(45) Date of Patent: Apr. 25, 2017

(54) SECURE SHORT-DISTANCE-BASED COMMUNICATION AND VALIDATION SYSTEM FOR ZONE-BASED VALIDATION

(71) Applicant: Accenture Global Services Limited, Dublin (IE)

(72) Inventors: Sunil Raina, Issaquah, WA (US); Avishek Somani, Toronto (CA); Alden Cuddihey, Kanata (CA); Scott Thomas Butler, Oakville (CA); Douglas Arthur Michael Archibald, Kanata (CA)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/468,198

(22) Filed: Aug. 25, 2014

(65) Prior Publication Data

US 2016/0055690 A1 Feb. 25, 2016

(51) Int. Cl.
*G07C 9/00* (2006.01)
*H04W 4/00* (2009.01)

(52) U.S. Cl.
CPC ........ *G07C 9/00007* (2013.01); *H04W 4/008* (2013.01); *G07C 2009/00769* (2013.01)

(58) Field of Classification Search
CPC ........... G07C 2009/00317; G07C 2009/00325; G07C 2009/00333; G07C 2009/00341; G07C 9/00007; G07C 2009/00349; G07C 2009/00357; G07C 2009/00365; G07C 2009/0038; G07C 2009/00555; G07C 2009/00579; G07C 2009/00587; G07C 2009/00595; H04W 4/008; G07B 15/00

USPC ............................ 340/5.61; 705/44; 235/382
See application file for complete search history.

(56) References Cited

U.S. PATENT DOCUMENTS

| 5,485,347 | A | 1/1996 | Miura |
| 7,255,264 | B2 | 8/2007 | De Leon |
| 7,567,920 | B2* | 7/2009 | Hammad ............... G06Q 20/32 705/13 |
| 7,731,086 | B2* | 6/2010 | Saunders ............... G06Q 20/10 235/380 |

(Continued)

FOREIGN PATENT DOCUMENTS

| CN | 104392501 | 3/2015 |
| CN | 105243689 | 1/2016 |

(Continued)

OTHER PUBLICATIONS

"The extended European search report" on EP patent application No. 15196185.1, European Patent Office, dated Feb. 22, 2016, 7 pages.

(Continued)

*Primary Examiner* — Joseph Feild
*Assistant Examiner* — Omar Casillashernandez
(74) *Attorney, Agent, or Firm* — Mannava & Kang, P.C.

(57) ABSTRACT

A secure short-distance-based communication and validation system validates users in a validation area. The system may include multiple zones in the validation area and beacons in each zone. A run-time mobile device identifier and keys that may be location-specific, device-specific and time-specific are generated and utilized for secure communication between mobile devices and a zone computer in a zone. The validation area may be in a vehicle, and validation may include deducting a fare.

25 Claims, 9 Drawing Sheets

(56) References Cited

U.S. PATENT DOCUMENTS

| | | |
|---|---|---|
| 8,326,221 B2 | 12/2012 | Dorsey |
| 8,369,842 B2 | 2/2013 | Proctor, Jr. |
| 8,781,502 B1 | 7/2014 | Middleton et al. |
| 8,856,916 B1 | 10/2014 | Sobel |
| 9,204,257 B1 | 12/2015 | Mendelson |
| 9,317,976 B2 * | 4/2016 | Andrews .............. G07B 15/00 |
| 2001/0045886 A1 | 11/2001 | Minowa |
| 2005/0070257 A1 | 3/2005 | Saarinen et al. |
| 2005/0093697 A1 | 5/2005 | Nichani |
| 2005/0233789 A1 | 10/2005 | Maekawa |
| 2006/0214815 A1 | 9/2006 | Komatsu |
| 2006/0242908 A1 | 11/2006 | McKinney |
| 2007/0276765 A1 | 11/2007 | Hazel |
| 2010/0066503 A1 | 3/2010 | Rhie et al. |
| 2011/0137773 A1 * | 6/2011 | Davis, III .............. G06Q 30/04 705/34 |
| 2011/0153495 A1 * | 6/2011 | Dixon .................... G06Q 20/10 705/39 |
| 2012/0235812 A1 | 9/2012 | Maia et al. |
| 2012/0254040 A1 | 10/2012 | Dixon et al. |
| 2013/0090134 A1 | 4/2013 | Heshmati |
| 2013/0165157 A1 * | 6/2013 | Mapes .................... H04W 4/02 455/456.5 |
| 2013/0201286 A1 | 8/2013 | Schockmel |
| 2013/0322674 A1 | 12/2013 | Ren et al. |
| 2013/0332007 A1 * | 12/2013 | Louboutin ............ H04W 4/021 701/2 |
| 2014/0095227 A1 | 4/2014 | Parker et al. |
| 2014/0273857 A1 | 9/2014 | White et al. |
| 2014/0344036 A1 | 11/2014 | Serad |
| 2015/0042451 A1 | 2/2015 | Matsumoto |
| 2015/0120558 A1 * | 4/2015 | Andrews ............ G07C 9/00571 705/44 |
| 2015/0289207 A1 | 10/2015 | Kubo |
| 2015/0289295 A1 | 10/2015 | Granbery |
| 2016/0007184 A1 | 1/2016 | Kulikov |
| 2016/0019726 A1 | 1/2016 | Joy et al. |
| 2016/0044460 A1 | 2/2016 | Cornaby |
| 2016/0073264 A1 * | 3/2016 | Van den Broeck ... H04W 4/021 455/411 |
| 2016/0087959 A1 | 3/2016 | Park |

FOREIGN PATENT DOCUMENTS

| | | |
|---|---|---|
| WO | 2015100185 | 7/2015 |
| WO | 2015123378 | 8/2015 |

OTHER PUBLICATIONS

"The Partial European search report", European Patent Application No. 15182143.6, European Patent Office, dated Jan. 21, 2016, 7 pages.

Radius Networks, "How to Pop a Pass Using iBeacon Technology", http://developer.radiusnetworks.com/blog/ Downloaded on Nov. 28, 2015, 19 pages.

Masabi, "Transport Operators and Barcode M-Ticketing", London, UK, download date Oct. 28, 2015. http://www.masabi.com/wp-content/uploads/2011/02/Transport-Operators-and-Barcode-mTicketing.pdf HopOn, "HopOn Beacon", download date Oct. 28, 2015, 9 pages. http://hopon.co/technology/.

Two Canoes, "Bleu Meetings", download date Oct. 28, 2015, 5 pages. http://twocanoes.com/products/online-services/bleu-meetings.

MTA, "LIRR Seeking Development of Train Ticketing App", Jan. 26, 2013, 2 pages. http://www.mta.info/news/2013/01/26/lirr-seeking-development-train-ticketing-app.

Intercom, "How Mobile Ticket delivery works?", download date Oct. 29, 2015, 3 pages. http://www.intercom.ee/mobile-ticketing-works.

* cited by examiner

SECURE SHORT-DISTANCE-BASED COMMUNICATION AND VALIDATION SYSTEM FOR ZONE-BASED VALIDATION

BACKGROUND

For a variety of situations and reasons, it may be desirable to control. monitor and validate people's access to an area of interest. For example, it is not uncommon to include a gate to block entrance to a parking lot or secured facility. In another example, mass transit systems, such as subways, often include some form of entrance control to enforce fare payment to ride the subway. Also, other places, like concert halls, stadiums, etc., still have conventional paper tickets, and people are employed to physically validate each individual ticket.

Controlling access to these areas can be automated. For example, a user has a card key, and a reader is installed at a locked entrance. To gain access to the area, the user inserts his card key into the reader or places it in very close proximity to the reader so the reader can read the card key. The information transmitted from the card key may be an ID and/or other information for the user and is processed through appropriate business rules to determine if the user is authorized to access the area. If the user is determined to be authorized, the door is unlocked and the user is allowed to enter.

In other examples, instead of being automated, a person is responsible for monitoring or controlling an area. For example, a security guard is responsible for checking people entering an area. In another example, passengers purchase tickets to ride on a train and after the passengers are on the train, a train conductor checks each person to determine if they have a ticket.

In the situations described above, either a user is required to have to carry an additional card key and physically present the card key to the reader to gain access to the restricted area, which can be a major inconvenience, or personnel, such as a security guard or a train conductor, are needed to control or monitor an area, which is not always cost effective and is susceptible to human error. Furthermore, the security of conventional systems is not optimal. In conventional systems, security codes used to validate the card keys are often stored on readers, and encoded into the card keys. They are highly susceptible to hacking and as a result create a vulnerability of providing unauthorized access to restricted areas.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
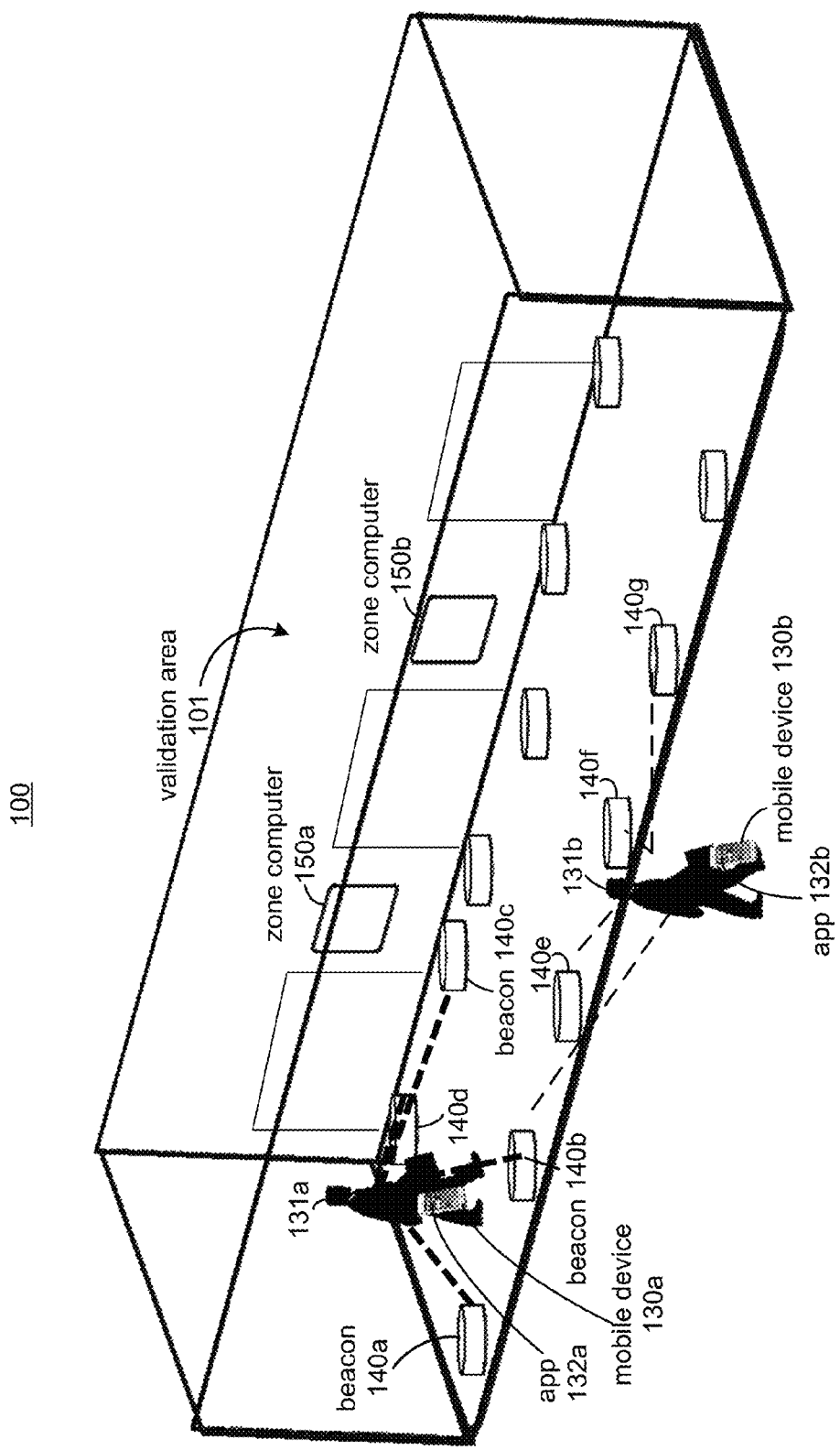
FIG. 1 illustrates a secure short-distance-based communication and validation system, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A secure short-distance-based communication and validation system validates individuals in a validation area. The system for example employs low-powered beacons, such as Bluetooth beacons, IBEACON, Bluetooth enabled computers running an application in peripheral mode, a Bluetooth tag acting as a peripheral or the like, and zone computers in the validation area. Individuals communicate through their mobile devices, which can execute an application for validation, such as fare payment, with the beacons and the zone computers for validation.

Furthermore, the system may be used in transit scenarios involving buses, trains, non-gated stations, or other non-gated environments where the individual does not pass through a turnstile or fare gate. Signals from the beacons may be used to determine the position of a user's mobile device before interacting with a zone computer to validate the user. For example, the validation area may be inside the vehicle or on a train station platform. The system determines whether the individual is in the validation area and settled inside the validation area, such as settled inside the bus or settled on the train station platform, before conducting validation, which may include fare payment. For example, an application running on a mobile device of the individual detects all available beacons and determines whether the individual is in a settled state before conducting validation, so that a passenger who accidently enters the vehicle, and immediately leaves is not improperly charged. Thus, the system includes mechanisms for preventing accidental fare deduction influenced by the beacons and zone computers.

The system facilitates secure communication through short-distance-based communication between the mobile devices and the zone computers and through on-the-spot unique identifiers generated by the mobile devices. The unique identifiers enable the secure communication between the mobile devices and the zone computers. Each unique identifier may be generated for a specific mobile device at its current location proximal to a zone computer. Unique identifiers may be determined or derived or calculated or computed from signals or broadcast packets received from the beacons for the current location of the mobile device. For example, the unique identifiers are unique to the current location and time of the mobile device when it transmits the unique identifiers to the zone computer associated with the sub-location where the mobile device is located. Also, a user's existing mobile device may be employed to gain access to the restricted area. For example, an access control application is loaded on the user's mobile device to enable access to the restricted area. Also, the messages exchanged between the mobile device and the zone computer may be encrypted using one or more encryption keys valid only for the current sub-location, mobile device and time. Also, an application running on the mobile device that facilitates security and other functions can easily be remotely updated over a network. By employing the short-distance-based communication for message exchange between the mobile device and a zone computer, the user does not need to physically place a card key on a reader to access the restricted area. Instead, the mobile device may remain in the user's pocket or bag and engage in activation and validation processes with the zone computer and other external computers to validate the user for the validation area. Additionally, the system may include multiple zones in the validation area that are in close proximity but the system employs techniques to minimize cross-talk between mobile devices and zone computers to facilitate secure message exchange and validation of multiple users simultaneously. The secure communication and cross talk minimization of the secure short-distance-based communication and validation system represent significant technical advantages over existing systems.

FIG. 1 illustrates a secure short-distance-based communication and validation system 100, referred to as the system 100. The system 100 is employed at validation area 101. The validation area 101 may be a geographic area or location and/or a physical structure that individuals can enter and exit. The physical structure may be a mobile structure, such as a vehicle (e.g., bus, train, car, airplane, etc.), or a stationary structure such as a building or some other type of stationary structure. Also, the validation area 101 may or may not have physical structures to control entry or exit into validation area 101. For example, a validation area 101 may be an open area.

The system 100 may be used for a non-gated environment or any area where individuals may be free to enter or exit and validation is performed if the individual is detected in the validation area 101. For example, a mass transit system may not have a gate or physical barrier that is controlled depending on whether a fare is paid. For example, a user may enter a bus without restriction, i.e., all individuals at a bus stop can enter the bus. The system 100 may be used to validate an individual after entering the bus without requiring the bus driver to interact with the individual. In another example, an individual may be allowed to enter a train station or train platform through a non-gated entry and allowed to enter the train. However, this individual is expected to purchase a ticket to ride the train. The system 100 may be used to execute fare payment or to confirm that the ticket has been purchased without restricting access to the train or a train station through a gate or through another physical barrier.

Furthermore, the validation area 101 may be divided into a plurality of sub-locations, also referred to as zones. Validation occurs in any of the zones in the validation area 101. Multiple individuals can be validated simultaneously in each zone.

The area 101 is referred to as validation area 101 because individuals in the area are validated, for example, to determine whether they are approved to be in the validation area 101 and/or to grant or deny approval of them being in the validation area. Accordingly, validation may include determining whether individuals in the validation area 101 are approved to be in the validation area 101 and/or granting or denying approval of being in the validation area 101. Validation may be based on validation rules stored in the zone computers or a backend server or the mobile devices. In one example, validation may include paying a fare associated with the validation area, such as paying a fare for riding a bus, train or taxi. The validation rules may include rules to determine the amount of fare, such as whether the fare is based on distance or number of stops or whether a single fare is charged for any distance traveled, or based on other fare payment rules.

The system 100 is for validating users or individuals in the validation area 101. "Users" and "individuals" are generally used interchangeably in the present disclosure and refer to anyone or anything that is to be validated in a validation area.

The system 100 may include end user mobile devices 130 that can each run a validation application, shown as validation applications 132 for the mobile devices 130, to receive information from beacons 140 and exchange information with zone computers 150 to facilitate validation in the validation area 101. Mobile devices 130a and 130b are shown for users 131a and 131b respectively to illustrate that users can use mobile devices for validation in the validation area 101. Of course, any number of individuals using mobile devices may be validated by the system 100. Also, multiple beacons (like Bluetooth beacons, IBEACONS, Wi-Fi access points, etc.) 140, including beacons labeled 140a-d, and multiple zone computers 150, including zone computers labeled 150a-b, are shown, however, any number of beacons and zone computers may be included in the system 100 depending on various factors, such as how many users need to be processed simultaneously in the validation area 101. The beacons 140 may be positioned at strategic locations inside the validation area 101 to facilitate accurate detection of a user within the validation area 101. The broadcast range, power and frequency of the beacons can be tuned per the environment. For example, the broadcast range of the beacons is tuned to cover the boundaries of their respective zones. For example, the beacons 140 can broadcast towards the inside of their respective zone and may have a range to cover their zone but not much farther to prevent accidentally validating a mobile device that may be adjacent the validation area 101 but not in it. Also, the validation applications 132 running on the mobile devices 130 can filter out the beacons below a specific power range or signal strength or angle or distance. Also, each of the zone computers 150 may be associated with a different zone in the validation area 101, and a mobile device in a zone can identify the zone computer for the current zone based on location information determined from signals received from the beacons in the zone.

The beacons 140 are hardware that can broadcast beacon signals. The beacons 140 may be standalone devices or incorporated into another system. A zone computer may have a beacon. The beacons 140 broadcast beacon signals at a short distance, such as up to 10 meters or a much shorter distance, such as up to 4 centimeters. For example, the beacons 140 may be Bluetooth, Bluetooth Low Energy, or near-field communication beacons, or Wi-Fi and the range of each of these types of communication protocols is described below. The beacons 140 may be part of a local positioning system, such as IBEACONS, that are used to wirelessly determine the position of the mobile devices 130 inside the restricted area 101.

The mobile devices 130 may be any computer that a user may carry and that can run applications including the access control applications 132. Examples of the mobile devices 130 include mobile phones, tablets, wearable computers, such as GOOGLE glass or smart devices embedded into clothing, a smart watch, fitness tracker, or wireless enabled shoes, or some other type of mobile computer. The mobile devices 130 may include short-distance wireless communication interfaces that can wirelessly communicate with beacons 140 and zone computers 150 when in proximity to the beacons 140 and the zone computers 150. Also, in addition to receiving signals from the beacons 140, the mobile devices 130 themselves may operate as a beacon and broadcast a beacon signal or act as a peripheral, enabling services and/or characteristics, or act as a central and start searching for peripherals with certain services and/or characteristics and/or name and/or other unique identifiers. The mobile devices 130 may include a beacon. In one example, a short-distance communication interface in a mobile device can broadcast a beacon signal to initiate communication with a local zone computer as is further described below, and the beacon signal is dynamically generated. In one example, the short-distance wireless communication interfaces may include near-field communication (NFC) interfaces. NFC is a set of standards for smartphones and other mobile devices to establish radio communication with each other and other computers by touching them together or bringing them into close proximity. The close proximity may be a few inches or few centimeters (e.g., 4 centimeters). Other wireless interfaces may be used. For example, Bluetooth may be used and has a longer range, but may consume more battery power and is more susceptible to cross talk. In another example, Bluetooth Low Energy (BLE) or Bluetooth 4.0 or future versions of Bluetooth wireless interfaces may be used. BLE is a wireless technology that is intended to provide reduced power consumption when compared to Bluetooth but has a similar range to Bluetooth. The components of the system 100 may have one or multiple types of short-distance wireless interfaces, which may have ranges from a few centimeters to a few meters. In another example, the range is up to 100 feet. The zone computers 150 and beacons 140 include wireless interfaces to communicate with the mobile devices 130 and other computers as needed. As described above, examples of the wireless interfaces may include NFC interfaces, Bluetooth communication interfaces and/or BLE communication interfaces but other short-distance wireless interfaces may be used. The zone computers 150 and mobile devices 130 may utilize other communication interfaces as well, which are wired or wireless and may be network interfaces, but communication between the beacons 140 and the mobile devices 130 and communication between the zone computers 150 and the mobile devices 130 for the system 100 may rely on short-distance wireless interfaces for communication with each other. The mobile devices 130 include a short-distance interface that matches the beacons signals broadcast from the beacons 140. So if the beacons 140 broadcast Bluetooth signals, the mobile device 130 at least include a Bluetooth interface to receive the signals, and so on.

The zone computers 150 validate the users 131 through their mobile devices 130. The zone computers 150 may include beacons but are not required to include the beacons. The zone computers 150 for example are validators. For example, a zone computer may be a fare payment device that can interact with a mobile device to deduct money or otherwise accept payment for a fare.

The beacons 140 may include small computers that may be attached to or embedded in a physical infrastructure. The beacons 140 may broadcast a message every x milliseconds (ms), where x>1 ms and may be less than 200 ms but other intervals may be used and the intervals may depend on the environment and use case. The message may be a unique identifier (ID) or a set of unique IDs or a combination of generic IDs and unique IDs. In one example, at least one part of the ID is generic and the other part is unique. In one example, the ID may include a universally unique identifier (UUID) a major ID and/or a minor ID. For example, one of the identifiers is generic (e.g., UUID and/or the major ID) and may be the same for all beacons that belong to or are for a particular entity, such as for the same company or the same mass transit system, or may vary between different entities or restriction level within the same company or mass transit system, like different unique ID between rail, subway and bus. The other unique ID (e.g., minor ID) may help identify a particular location or sub-location. For example, the major ID may be the same for all beacons that belong to a particular location within the system, such as a specific rail station or a bus stop or vehicle, or vary within the same location, such as different major ID for different subway cars in the same train. The minor ID may be different and unique to the beacon and can be associated with a particular sub-location within a location. For example, a minor ID may be for a particular subway car or location within a particular subway car. In another implementation, the unique identifiers may be assigned using a mathematical function, such that the mobile device or the zone computer can calculate the location and sub-location information from the unique identifiers broadcasted by the nearby beacons.

The mobile devices 130 listen for the broadcasts from the beacons 140, which may contain the unique identifiers for each beacon, or inputs from which the unique identifiers may be calculated or computed or derived or looked up in an internal data store. When a mobile device is in range of one or more of the beacons 140, unique identifiers received from the beacons at the mobile device may invoke a detection mode in the mobile device to determine whether the mobile device is in proximity to a zone computer in the validation area 101. This is referred to as detection or detection mode. After detection, the mobile devices 130 engage in activation and a peripheral mode to communicate with the local zone computer as is further described below.

The unique identifiers, signal strength (such as received signal strength indicator (RSSI), transmission power, and/or received Power) of the beacon's broadcasts, broadcast zone, broadcast accuracy, azimuth and angle of the beacon (e.g., calculated from the received wireless broadcast) help identify the location of the mobile device. If the mobile device detects that it is in a validation area, it enables validation mode. This may involve the mobile device getting into a peripheral mode, wherein the mobile device may start sending message broadcasts over the wireless interface (e.g. Bluetooth 4.0), like a beacon. For example, the mobile device acts as a Bluetooth peripheral and advertises, broadcasts, transmits, and/or enables its services and/or characteristics using one or more of the unique IDs calculated above. The zone computer may use the unique IDs to identify the mobile device or the services/characteristics advertised, broadcasted, transmitted, and/or supported by the mobile device or the fare payment application on the mobile device. In another example, the zone computer broadcasts a services message indicating that it is available for validation and the mobile device ID calculated by the zone computer is included in the services message. The mobile device receives the services message, determines whether the mobile device ID in the services message matches the mobile device ID calculated by the mobile device, and if it does match, initiating a message exchange for authentication and validation.

In another example, the establishing of communication between a mobile device and a zone computer may include the zone computer scanning for a mobile device in range. The zone computer checks signal strength, etc. to determine if a mobile device falls within its sub-location. If so, the zone computer connects to the mobile device and then runs a service discovery to check for available services/characteristics of the mobile device. If the zone computer finds the services it is interested in, it continues or else disconnects with the peripheral (i.e., the mobile device). In yet another example, the mobile device determines a name (e.g., a local name) from information in a beacon signal and includes it in information broadcasted from the mobile device. The zone computer receives the broadcast and determines whether it includes the local name. If so, the zone computer determines that the mobile device is to be validated.

The zone computers 150 include computers that may be provided in the validation area 101 for authentication and validation of users in the validation area 101. A zone computer may support an entire validation area or a zone in the validation area. In one implementation, the zone computers 150 are looking for mobile devices which are broadcasting, advertising, and/or transmitting a specific unique ID or IDs and/or supporting services and/or characteristics with a specific unique ID or IDs, signal strength, location or a combination of them or all. Once a zone computer detects a mobile device that matches the criteria, the zone computer may connect to the mobile device via the wireless interface (e.g. Bluetooth 4.0 or BLE or future versions of Bluetooth, Wi-Fi, etc.) and may begin the authentication process, which may then be followed by the message exchange for validation. The zone computers 150 engage in message exchange and validation processes with the mobile devices 130 for authentication and validation after the mobile devices enter peripheral mode, which may be invoked after the mobile devices 130 detect that they are in the validation area 101 and that the mobile devices 130 are settled. For example, a process is executed to establish a secure communication channel between a mobile device and a zone computer through run-time key generation, which may be based on unique user credentials, unique IDs of beacons and other information. Messages may be exchanged via the secure communication channel to perform validation. In one example, validation may include fare-based validation, such as when payment of a fare is required. The zone computers 150 may be connected to a back-end server via the Internet or another wide area network to provide updates and perform other functions which may include validation-related functions.

Figure 2:
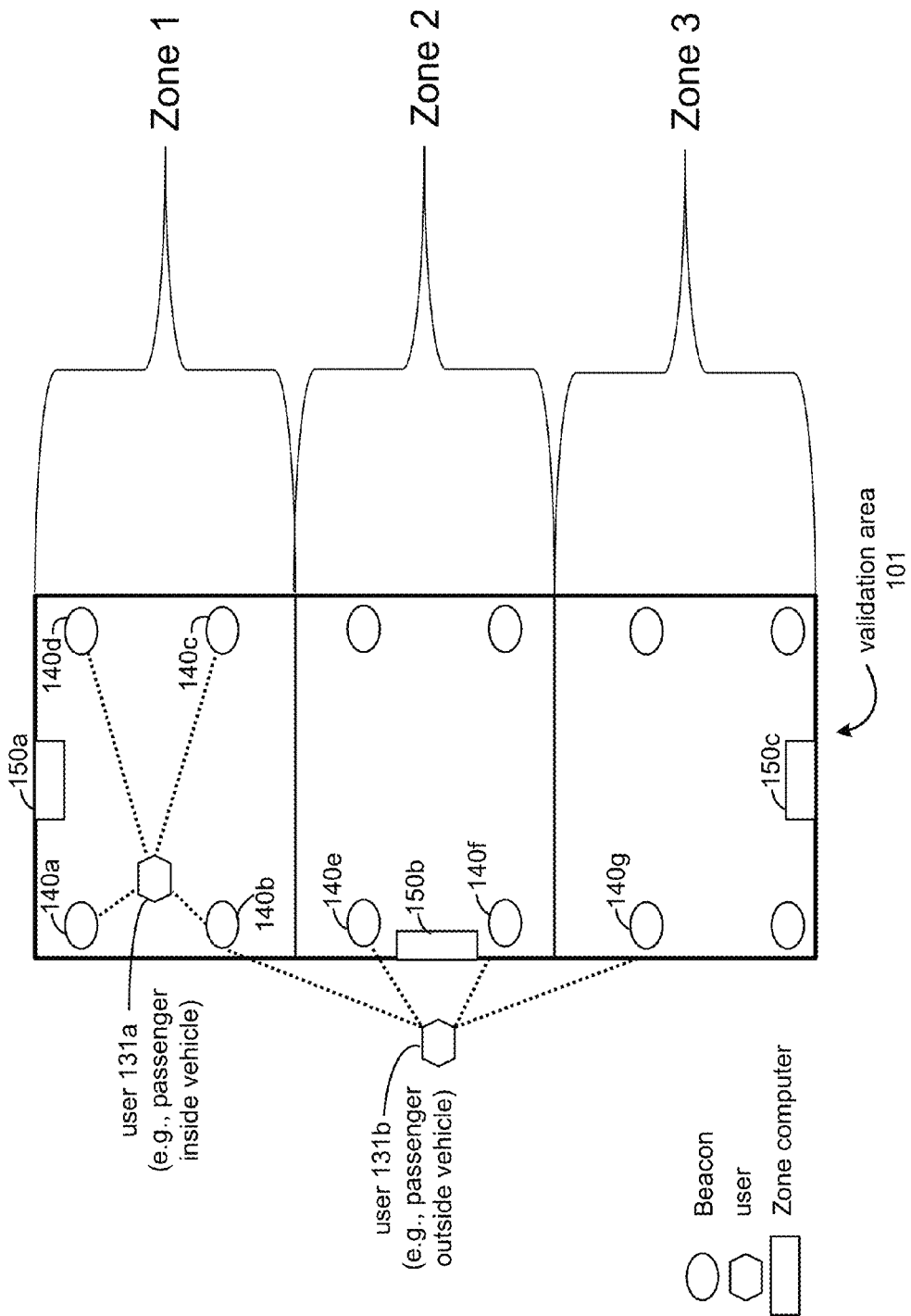
FIGS. 2 and 3 show examples of zones in a validation area.

FIG. 2 shows an example of a configuration of beacon placement in multiple zones 1-3 in the validation area 101. The validation area 101 may be inside a vehicle, such as a subway car. The subway car may have multiple zones 1-3, which may be adjacent doors to get in and out of the subway car. In this example, user 131a is in zone 1, and user 131b is outside zone 2 and outside the subway car (i.e., outside validation area 101). When the user 131a enters zone 1, the mobile device 130a for the user 131a receives the signals from beacons 140a-d. The validation application 132a running on the mobile device 130a enters detection mode and detects that it is in a zone in the validation area 101 and is in proximity to the zone computer 150a. For example, the validation application 132a uses the beacon information from signals received from the beacons 140a-d to determine its location and calculate the passenger's position in zone 1. The beacon signals relative strength, angle, azimuth, etc. and the location information derived from the major ID or minor ID or carried in the payload of the signals are used to determine the precise location of the user 131a. The precise location may indicate that the mobile device 130a or the user 131a is in zone 1 and may further identify an area within zone 1, such as a seat.

At the current location of user 131b, the mobile device 130b of user 131b receives beacon signals from beacons 140b and 140e-g. The beacon signals relative strength, angle, azimuth, etc. and the location information derived from the major ID or minor ID or carried in the payload of the signals from beacons 140b and 140e-g are used to determine the precise location of the user 131b. Based on this information, the validation application 132b may determine that the user 131b is outside the validation area 101 and not enter peripheral mode. For example, the validation application 132b may determine that the signals are from beacons assigned to different zone computers, such as zone computers 150a-c. Also, from the signal strength, angle, and azimuth, the validation application 132b may determine that the signals from beacons 140b and 140g have a signal strength below a threshold, and an angle and azimuth that are indicative of beacons associated with different zones and different zone computers. Thus, the validation application 132b may ascertain that the closest beacons are beacons 140e-f. The validation application 132b may further determine that since it is not receiving signals, or receiving signals that are too weak, from for example at least three or all four beacons for the same zone, that it is outside the validation area 101. Therefore, the validation application 132b does not enter peripheral mode and does not engage in validation.

Also, the zone computers 150 may be connected to displays (not shown) to provide indication to the user of whether they are validated or not. For example, zone computer 150a may display a message indicating user 131a is validated. If multiple users are in the zone, a user ID may be displayed along with an indication of whether the user is validated. For example, a check mark indicates a person is validated. If the person is not validated, the display may show an X, and may provide additional information, such as "See Attendant" or "Insufficient Funds" if the user's account does not have sufficient funds to pay a fare. Also, external systems may be invoked, such as to alert attendants or to automatically replenish funds in a user's account.

Figure 3:
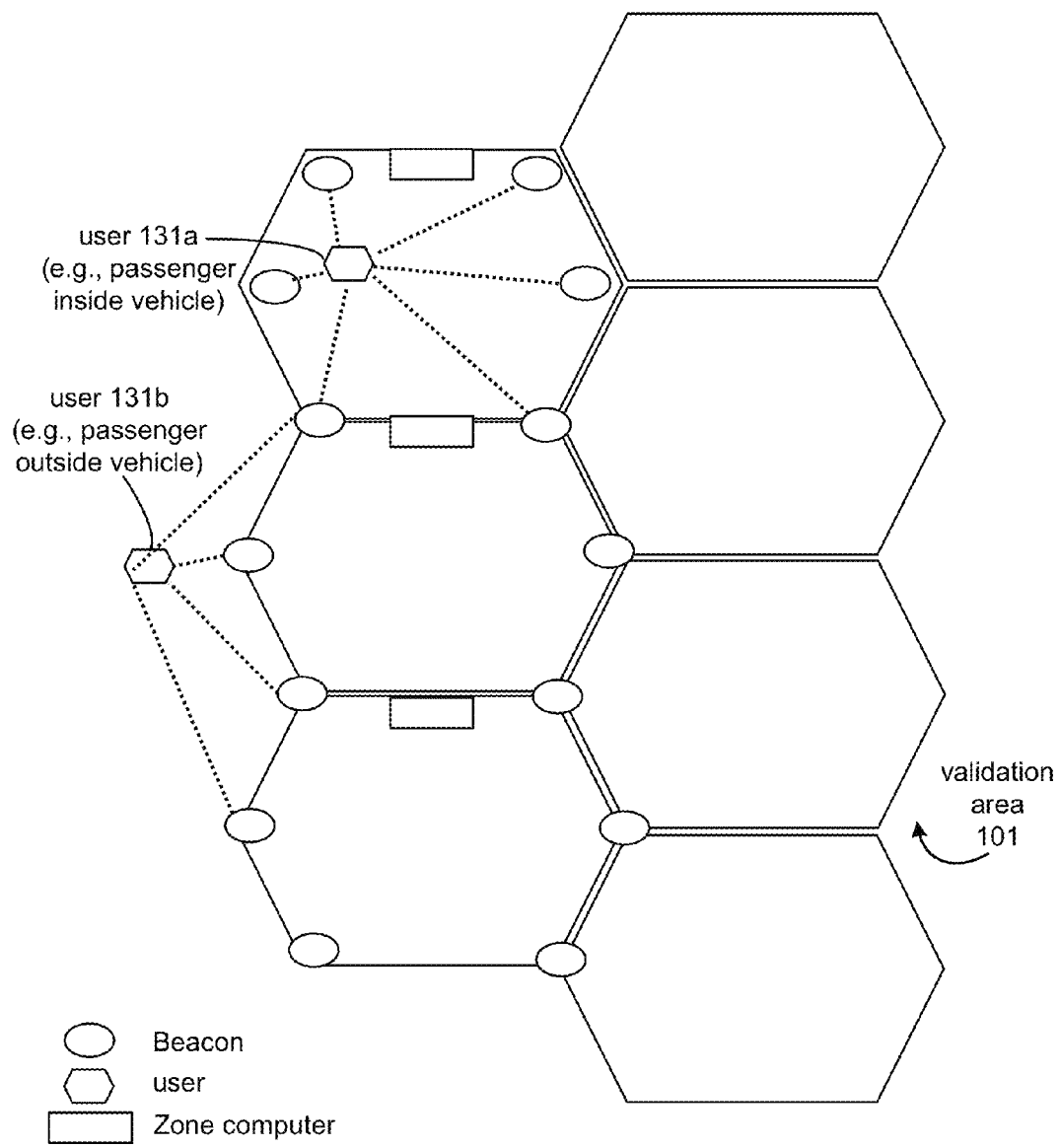

FIG. 3 shows an example of a different configuration of beacons in a zone, and a different configuration of a zone. In this example, the zone shape is different than the zones shown in FIG. 2. Also, the number of beacons and the location of the beacons for each zone are different than shown in FIG. 2. With more beacons per zone, a more precise location of a mobile device within a zone may be determined, for example, based on signal strength, accuracy, signal angle and azimuth. The determination of whether a mobile device is inside a zone or outside the validation area 101 may be similar to as described with respect to FIG. 2.

Figure 4:
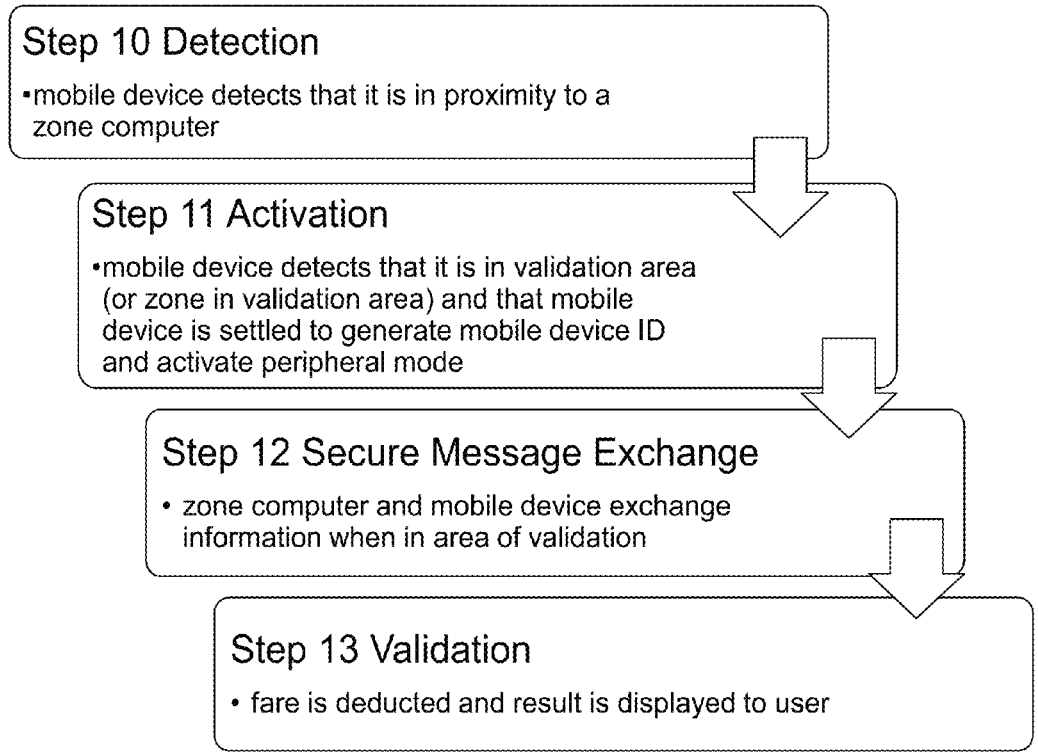
FIG. 4 shows a high-level flow chart of a validation method that may be performed by the a secure short-distance-based communication and validation system, according to an example of the present disclosure.
Figure 5:
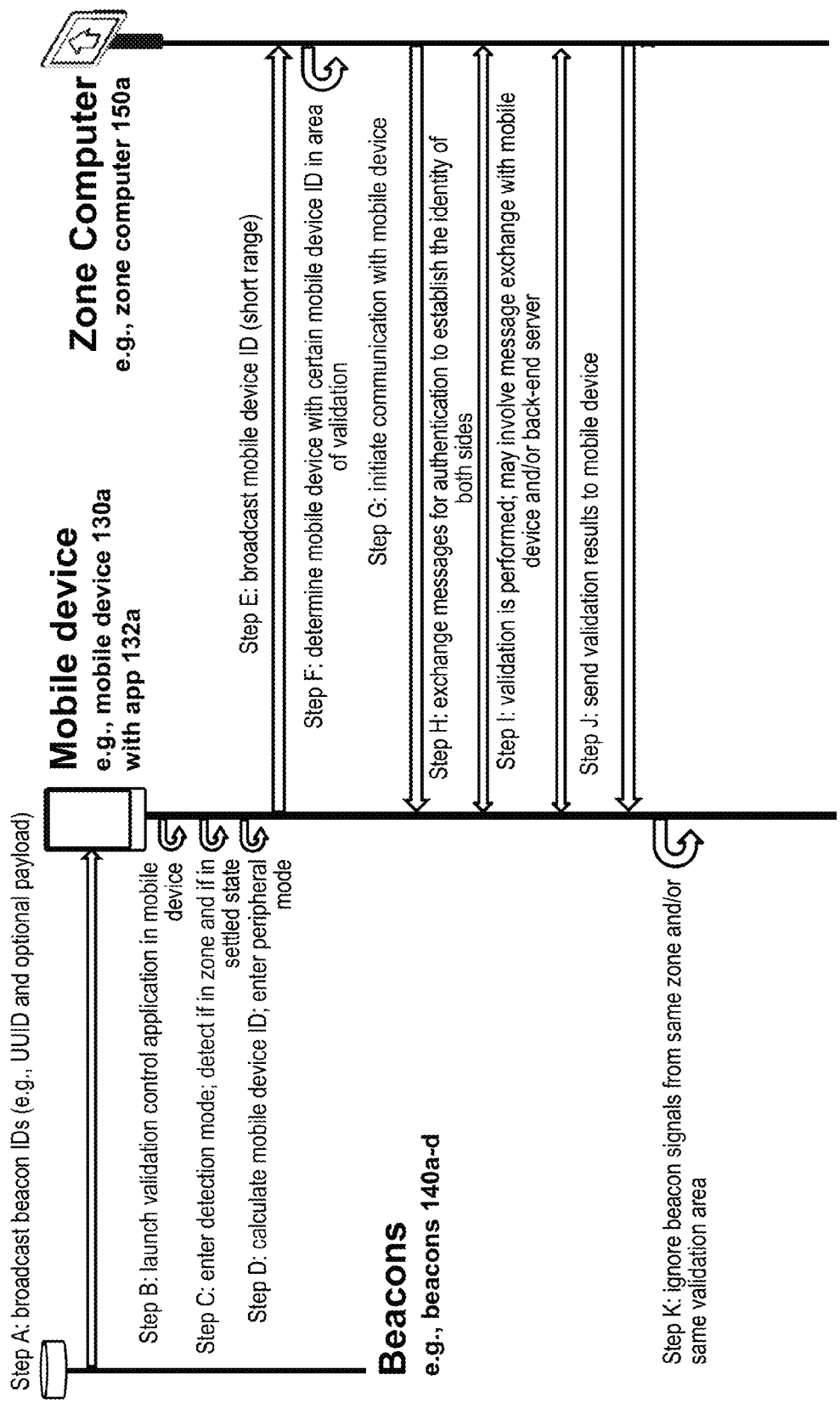
FIG. 5 shows additional details of the steps of FIG. 4, according to an example of the present disclosure.

FIG. 4 shows a high-level flow chart of steps performed by the system 100, and FIG. 5 shows additional details of the steps and the interaction between the various sub-systems of the system 100, including the mobile devices 130, beacons 140, and zone computers 150 that perform the steps, according to an embodiment. Referring to FIG. 4, steps are shown for detection at step 10, activation at step 11, exchange at step 12 and validation at step 13.

At step 10, for detection, a mobile device determines whether it is in an area of validation (e.g., proximity to a zone computer) based on information received from beacons. Determining proximity to a zone computer (e.g., determining whether it is in an area of validation) may include determining whether the mobile device is within a predetermined distance to a beacon or a plurality of beacons associated with a zone computer. Determining the distance to a beacon may be estimated based on signal strength, signal angle and azimuth, etc. According to an example, mobile device 130a shown in FIG. 2 receives signals from the beacons 140a-d. Each signal includes a beacon ID, e.g., including major ID and minor ID. Each beacon ID may be determined so that it can be used to identify its location, such as station, zone, etc. The beacons 140a-d may also transmit a small payload containing the location information or any other information that can help to calculate the location information.

In one example, triangulation-based detection is performed to determine whether the mobile device 130a is in a zone. For example, the validation application 132a running on the mobile device 130a registers for beacon notifications with a specific unique ID or IDs or part of the IDs, e.g. UUID and/or major ID and/or minor ID or a list of UUIDs and/or major IDs and/or minor IDs. For example, the UUIDs or the major IDs may be the same for all beacons provided by the same entity, such as all beacons for the same mass transit company or all beacons for the same train station. So, for example, the major IDs in unique IDs broadcasted by the beacons 140 may be the same because they are for the same entity or same train station. The validation application 132a stores a list of UUIDs, major IDs and minor IDs that it may respond to. The mobile device 130a listens for broadcasted unique IDs from beacons. If the unique IDs of the beacon signals that are received are registered, such as stored in the list, the validation application 132a determines whether it is in a zone in a validation area. For example, in response to recognizing broadcasts from beacons 140a-d or at least two of the beacons, using algorithms like triangulation, the validation application 132a determines that it is within a predetermined distance (e.g., within 1 meter) to at least two of the beacons 140a-d. Thus, the validation application 132a determines that it is in a zone, such as zone 1, and then proceeds to activation at step 111.

In another example, tap-based detection is performed. For example, the user lightly taps the mobile device 130a on or near beacons 140a or at zone computer 150a if it also acts as a beacon. The range of the beacon may be tuned so that the mobile device 130a needs to be in close proximity to detect the beacon, such as within 3-4 centimeters, or the mobile device might take into consideration the signal strength, zone, accuracy and other factors of the beacon broadcast to determine the proximity with the beacons, and decide accordingly. If a beacon unique ID or IDs are received that are registered at the mobile device 130a, in response to the tapping or placement in close proximity to the beacon, the access control application 132a performs activation at step 11. In another example, an intent of the user to enter validation is determined for example based on measurable user actions performed on the mobile device, such as shaking the mobile device twice, audible command spoken into the mobile device, etc.

At step 11 shown in FIG. 4, after detecting proximity to a zone computer at step 10, activation is performed. For example, activation may include determining whether the mobile device 130a of the user 131a is in a zone in the validation area 101, and determining whether the mobile device 130a is in a settled state or not. If the mobile device is in a zone, such as described with respect to FIG. 2 and user 131a shown in FIG. 2, and is in a settled state, a run-time mobile device ID and/or a run-time key are calculated for the mobile device 130a for future secure message exchange with the zone computer 150a, and a peripheral mode is activated. The peripheral mode is entered to communicate with the zone computer associated with the current location of the mobile device 132a, which is zone computer 150a.

Determining whether the mobile device 130a is in a settled state may be performed to prevent accidentally entering into validation for fare payment. For example, the settled state indicates whether a mobile device is in a predetermined location for a predetermined amount of time. For example, if a user enters a bus with a validation area and then exits the bus immediately, the mobile device of the user may receive a signal from a beacon in the bus. However, because the user does not settle in the bus, validation is not performed and the user is not charged.

The settled state may be determined from motion sensors and based on time. Measurements from different sensors inside the mobile device 130a (e.g., accelerometer, gyroscope, and/or motion co-processor) may be used to determine whether the mobile device 130a is stationary or is moving, and whether the mobile device 130a is moving in a direction outside the zone or outside the validation area and a rate of the movement. Also, the motion of the vehicle is determined in order to determine whether the mobile device is stationary or in motion while the vehicle is mobile or while the vehicle is stationary. If the mobile device 130a is moving while the vehicle is in motion, then the mobile device 130a may still be considered to be in a settled state but other factors may be considered. Also, the length of time the mobile device 130a is stationary may be ascertained from the sensor measurements to determine whether it is in a settled state. In one example, the validation application 132a activates the peripheral mode if the mobile device 130a is determined to be in a settled state, or the vehicle is in motion for a predetermined period of time, and/or the mobile device 130a has been inside the vehicle for a certain amount of time.

Unique ID determination may vary depending on how detection was performed. For example, if triangulation-based detection was performed, the unique IDs (like major ID, minor ID and optional payload) from the beacons used for triangulation may be used to calculate the unique ID or IDs for the mobile device. If tap-based detection was performed, the unique ID or IDs may be calculated using the unique ID or IDs from the beacon that was tapped (e.g. major ID, minor ID and optional payload from the beacon that was tapped). The peripheral mode is enabled in the mobile device to communicate with the zone computer for the lane using the unique IDs for the services and/or characteristics. Examples of unique ID calculation functions are described below.

In one example, the unique ID or IDs for the mobile device are calculated using the information received from the beacons and/or zone computer as the input. Thus, the unique ID is specific to the current location of the mobile device. The unique ID is not valid (or may not be valid) at a different location The current location may be a particular zone in the validation area 101 or a specific seat in the zone.

A unique ID calculation function may be used to calculate the unique ID or IDs for the mobile device from the information received from one or more beacons. An example of a unique ID calculation function is described below. Assume the following: Row=Minor ID/1000;

Sequence=Minor ID %1000, whereby % represents the modulo operator; Location=Major ID/1000; and Sub-Location=Major ID %1000.

If triangulation-based detection was used at step 10, the following steps may be performed to calculate the unique ID or IDs for the mobile device. The detected beacons are sorted based on the signal strength (like RSSI, transmission power, received power, etc.) in descending order. Beacons may be filtered, e.g., removed from the list, if their received signal strength indicator does not fall within a predetermined value, or if they proximity is unknown or if the azimuth and angle doesn't meet predetermined requirements or a combination of these. For example, if the signal strength is too weak, such as determined by comparing the signal strength to a predetermined threshold, the corresponding beacon may be removed from the list. Then, the top "x" beacons from the list are identified where x>1. In one example, x is greater than or equal to 3. If a plurality of beacons from the top "x" beacons have the required signal strength, then, the major ID and minor ID are used to calculate the Row, Sequence, Location and Sub-location information from the beacon signals, which is in turn is used to generate the unique ID or IDs. Beacons in the same lane may have the same location, sub location and row value.

If tap-based detection was used at step 10, then the following is performed with all the beacons that are found in range. At step 1, the beacons are sorted based on signal strength, accuracy, etc. in descending order and the first beacon in the list is identified or they are sorted in ascending order and the last beacon in the list is identified. Checks on the azimuth, angle, distance, accuracy are performed to ensure the mobile device is in the desired proximity of the beacon. At step 2, the signal strength value for this beacon should be greater than or equal to a predetermined value, e.g., <=−30 dB. At step 3, the row, location and sub-location information of the beacon is used to generate the unique ID or IDs.

One example of a unique ID calculation function for either tap-based detection or triangulation-based detection is: Unique ID=[Pre-defined Unique ID Part]+[Location]+[Sub location]+[Row]. In other examples, mathematical functions, such as a conventional hash function, RSA, etc., are employed that use these three values along with other values, to derive the unique ID or IDs. In other examples, mathematical functions can be used to determine these three values, which in turn become input to other mathematical functions to derive the unique ID or IDs. The input values may include current time, location, sub-location, row, sequence, etc.

At step 12 shown in FIG. 4, for message exchange, the mobile device and the zone computer for the zone exchange information for validation. Regardless of the way detection and activation were performed, message exchange occurs in the same way. The zone computer determines whether the mobile device is within its area of validation if the mobile device is within range. The area of validation may be a zone. For example, the area of validation for zone computer 150*a* is zone 1 shown in FIG. 2. To determine whether the mobile device is within the zone computer's area of validation, the zone computer may use the distance, signal strength, the azimuth and angle of the mobile device relative to the zone computer or a plurality of these values to determine the mobile device's location. The zone computer initiates a connection with the validation application on the mobile device if the mobile device is in the area of validation and the mobile device is broadcasting or advertising or transmitting one or more unique IDs and/or has predetermined services and/or characteristics. Then message exchange may occur for validation. For example, the zone computer 150*a* and the validation application 132*a* on the mobile device 130*a* may enter into authentication to establish the identity of both sides. After authentication, data is exchanged between the zone computer 150*a* and the validation application 132*a* for validation. The zone computer 150*a* and the validation application 132*a* may request additional data resulting in multiple exchanges. In another example, the mobile device may initiate the connection with the zone computer and then engage in authentication and then validation. Authentication in either case may include determination of keys for secure communication.

At step 13 shown in FIG. 4, validation is performed. Validation may be performed the same way regardless of how detection was performed. For example, the zone computer makes a decision on whether the user is validated based on data exchanged with the mobile device, equipment operational data, and/or real-time services hosted on a backend. The equipment operational data may include fare rules (different fare types, concession types, fare validity window, etc.), transfer rules, location information (e.g., zone computer location), etc. The real-time services may include fare payment. In another example, the backend may store authorization information for individuals to determine whether the user is cleared to be in the validation area 101. The decision of whether the user is validated is communicated to the user, such as through a display connected to the zone computer or through the mobile device. For example, the zone computer may send information to the validation application related to the validation decision and/or the user's account (e.g., new balance, transaction summary, etc.). The validation application may communicate the decision to the user using inbuilt features like haptic feedback, audio notification, visual notification, etc., based on user's preferences.

FIG. 5 shows details of the steps of FIG. 4 and illustrates the interaction between the devices in the system 100 performing the steps. For example, assume user 131*a* is entering zone 1 and has mobile device 130*a* running validation application 132*a*, such as shown in FIGS. 1 and 2. The mobile device 130*a* interacts with beacons 140*a-d* and zone computer 150*a* when performing the steps.

The beacons 140*a-d* periodically broadcast their unique IDs and optional payload indicating location. At step A, the mobile device 130*a* receives the broadcasts when in range. At step B, assuming the validation application 132*a* is not already running, the validation application 132*a* is launched for example if the operating system of the mobile device 130*a* recognizes the beacon IDs as registered beacon IDs. For example, beacon IDs that have a predetermined UUID, major ID and/or minor ID invoke launching of the validation application 132*a*. If tap-based detection is used, the validation application 132*a* may be launched if the user taps on or near a beacon and the unique ID of the beacon is registered. At step C, the validation application 132*a* enters detection mode to determine whether it is in a zone, such as zone 1 and whether the mobile device is in a settled state. Detection may include tap-based detection or triangulation-based detection. After detecting the mobile device 130*a* is in zone 1 and in a settled state, the validation application 132*a* enters activation mode to calculate the unique ID of the mobile device 130 based on information derived from the signals of the beacons 140*a-d*. The validation application 132*a* enters peripheral mode and a message with the unique ID of the mobile device is broadcasted or sent to a local zone computer, e.g., zone computer 150a, at step E. The broadcast may be a short range broadcast, such as using BLE or Bluetooth.

At step F, the zone computer 150a receives the message with the mobile device unique ID from the mobile device 130a assuming it is within range, and determines whether the mobile device 130a is within the area of validation of the zone computer 150a. An example of the area of validation may be a zone, such as zone 1. The zone computer 150a uses the distance, signal strength and optionally the azimuth and angle of the mobile device 130a, which may be determined from the received message, to determine whether the mobile device 130a is in its area of validation. For example, in addition to receiving the message from the mobile device 130a, the zone computer 150a may receive a message from a mobile device in zone 2. However, the zone computer 150a determines that only the mobile device 130a is currently in its area of validation, i.e., zone 1. Accordingly, the zone computer 150a communicates with the mobile device 130a for validation but not the mobile device in zone 2 at this instant.

At step G, if the mobile device 130a is determined to be in zone 1, the zone computer 150a initiates communication with the mobile device 130a. For example, the zone computer 150a sends an acknowledgment message to the mobile device 130a that includes the mobile device unique ID so the mobile device 130a knows that the zone computer 150a is ready to proceed to validation. In another example, the zone computer 150a may broadcast or transmit an acknowledgment message that is encrypted with the mobile device unique ID to the mobile device 130a. Only the mobile device 130a can decrypt the acknowledgment message sent from the zone computer 150a because no other mobile device knows the key. In yet another example, the zone computer 150a and the mobile device 130a calculate the mobile device unique ID independently using the same inputs and the same function. For example, the inputs for the unique ID calculation function described above may be determined by the mobile device 130a and broadcasted or sent to the zone computer 150a with the mobile device unique ID. Both the zone computer 150a and the mobile device 130a store the same function for calculating the mobile device unique ID. The zone computer 150a also calculates the mobile device unique ID. The zone computer 150a determines if the received mobile device ID matches the calculated mobile device ID to determine whether to continue with the process, e.g., initiate communication, authentication and validation.

Mutual authentication is performed at step H. The mobile device 130a and the zone computer 150a may exchange messages for authentication to establish identities of both sides. The mutual authentication might result in a generation of a key or set of keys that are then used for further encryption, decryption, enciphering, deciphering, etc. A conventional key encryption algorithm may be used.

At step I, the zone computer 150a determines whether the mobile device 130a or its user 131a is validated. Validation may include exchanging messages with a backend server not shown and/or the mobile device 130a to get the information needed to perform validation. In one example, validation may include a fare payment determination and the zone computer 150a may determine whether the fare can be paid from a user account for the user 131a. At step J, validation results are returned to the mobile device 130a. The zone computer 150a may also send information to the related to the user's account (e.g., new balance, transaction summary, etc.). At step K, if the user 131a is validated, e.g., a fare is paid, the validation application 132a can mute itself from the beacons in the same fare paid zone to prevent from being double-charged for the duration of the fare validity. If the validation is denied, the zone computer 150a can display an indication on a display that validation failed. If the user 131a is validated, the zone computer 150a can display an indication that the user 131a is validated.

After steps E and F are performed, keys may be used for secure communication. As described above, keys may be used to encrypt messages between the mobile device 130a and the zone computer 150a. Accordingly, the key may be used for secure communication between the mobile device 130a and the zone computer 150a. Also, the mobile device unique ID and/or the key are run-time. For example, they may be generated in real-time for the validation process and are only valid for the current time and location and for the particular mobile device. This provides additional security by improving the robustness of the key. In another example, MACing might be used to secure the communication between the mobile device 130a and the zone computer 150a. In another example, both encryption and MACing might be used to secure the communication between the mobile device 130a and the zone computer 150a.

At step I, validation may vary depending on whether information for validation is stored locally or stored in a backend server. For example, for a "stored value" system, information for validation is stored locally on the mobile device in a secure manner. For example, information, such as user profile, balance amount, passes and concession information are stored securely on the mobile device. In a "credential" systems, the information is stored on a backend server (e.g., the cloud), and the mobile device only stores credentials, such as user account number, and the information is retrieved from the backend server in real time for completing validation or enforcement of transactions.

The information for validation, whether a "stored value" or a "credential" system is being used, can be encrypted and stored within a local data storage in the mobile device. In one example, the mobile device may not have the encryption key to decrypt the information and only the zone computer or computers may have access to the encryption key (or keys) to decrypt the data. Additionally, the encryption key may be derived by the zone computer or a secure storage (like a secure access module (SAM) or hardware security module (HSM) or a secure element running applets, connected to the zone computer) using the user's information as one of the inputs. Also, the encryption keys with which the data is encrypted and passed encrypted to the mobile device may be changed every time the user tries to access a restricted area to prevent tampering with the data. The mobile device does not have access to the key which protects the data.

The information related to user's account may be stored inside a secure storage area inside the mobile device (like a secure element, a secure element micro secure digital card, a universal integrated circuit card, a secure area within the application processor, etc.). This may involve an additional authentication performed between the zone computer and the secure storage, establishing the identity of both sides, resulting which the information is shared by the secure storage with the zone computer via the validator mobile application.

Also, one or more keys may be used to encrypt the communication between the secure storage and the zone computer. Additional keys may be generated during mutual authentication, which are then be used for encryption for the current session only.

In another example, the information related to user's account is stored in the backend server and can be securely accessed and updated by either the mobile device or by the zone computers or both. The mobile device only stores the user's credentials which may be a user ID, account number, or a similar unique identifier which can be used to access the user's information from the backend server in real time.

Figure 6:
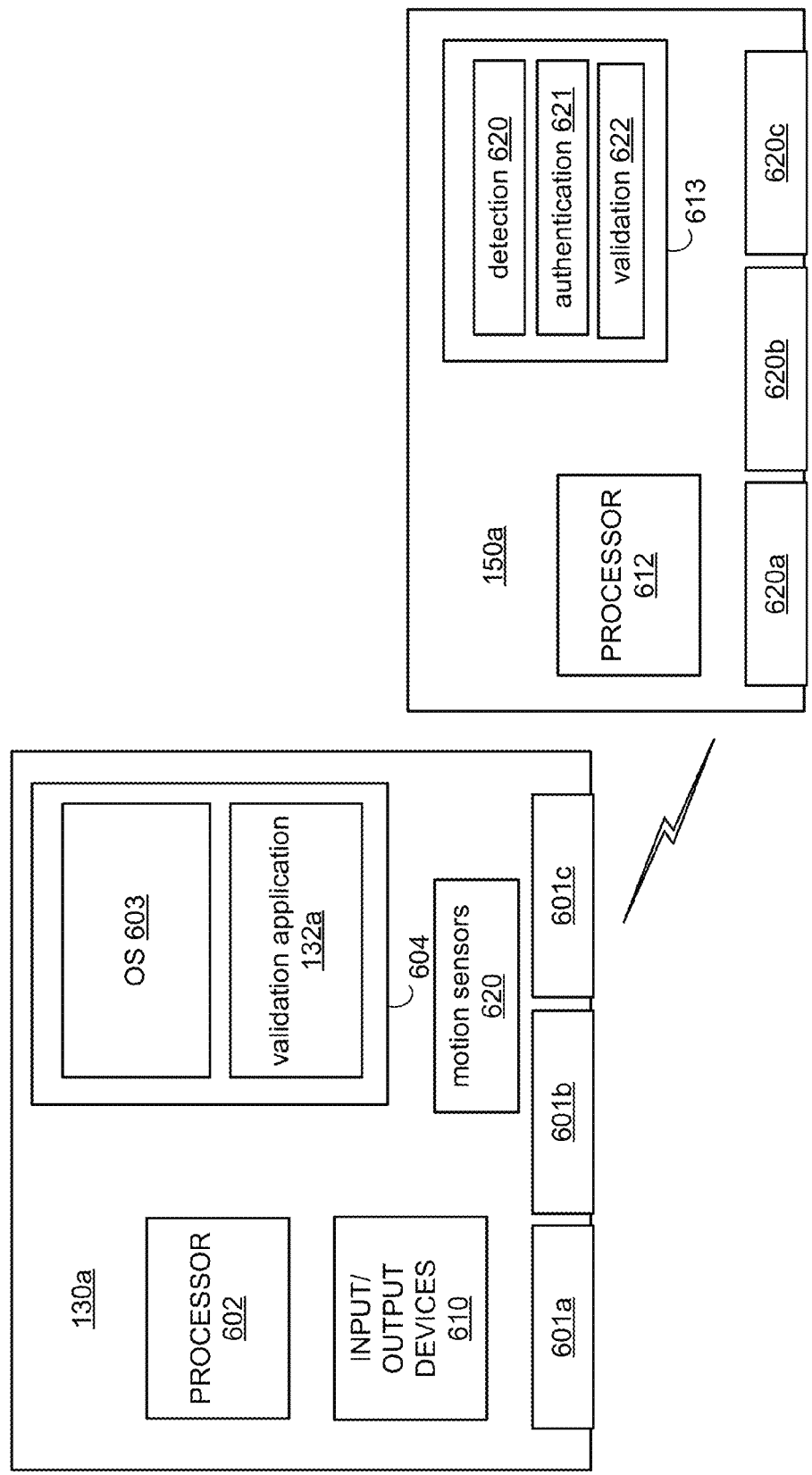
FIG. 6 illustrates a block diagram of the a secure short-distance-based communication and validation system, according to an example of the present disclosure.

FIG. 6 shows a block diagram of the mobile device 130a and the zone computer 150a in the system 100 but is representative of any of the mobile devices and the zone computers that may be used in the system 100.

The mobile device 130a may include multiple interfaces 601, wired or wireless, for communicating with other devices. For example, interface 601a may be a Wi-Fi interface or a cellular interface or may include both interfaces. 601b may include a Bluetooth interface. In one example, message exchanges between the mobile device 130a and the zone computer 150a are done through Bluetooth or Bluetooth 4.0 or BLE or future versions of Bluetooth but other interfaces may be used. Interface 601c may be a NFC interface, but the mobile device 130a may have both Bluetooth and NFC interfaces and multiple other interfaces. Interface 601b may be for communicating with the beacons 140, for example, for triangulation-based or tap-based detection.

The mobile device 130a includes a processor 602 and data storage 604. The processor 602 for example is an integrated circuit. The processor 602 may be a chipset with central processing unit and/or custom processing circuits, such as an application-specific integrated circuit (ASIC) or field-programmable gate array (FPGA). The processor 602 may run an operating system (OS) 603 and applications, including validation application 132a, for the mobile device 130a. The OS 603 and the applications are stored in data storage 604. The mobile device 130a includes input/output (I/O) devices 610, such as keyboard, touch screen display, speaker, etc. The I/O devices 610 may provide audio, visual and/or tactile output to indicate whether a user has been validated and allowed access to the validation area 101 or whether the user is denied access. The mobile device 130a also includes motion sensors 620. Examples of motion sensors 620 may include accelerometer, gyroscope, and/or a motion co-processor. Information from the motion sensors 620 may indicate information or measurements of the motion of the mobile device 130a. This information may be used to determine whether the mobile device 130a is in a settled state.

The zone computer 150a includes a processor 612 and a data storage 613. The processor 612 is an integrated circuit. The processor may execute software or firmware or comprise custom processing circuits, such as an application-specific integrated circuit (ASIC) or field-programmable gate array (FPGA). The data storage includes software or firmware including machine readable instructions. The software or firmware may include subroutines or applications for detection 620, authentication 621 and validation 622. The detection 620 includes determining when a mobile device is in the area of validation for the zone computer 150. Authentication 621 and validation 622 are described above and are for authenticating the mobile device 130a before communicating with it and validating the mobile device 130a. The zone computer 150a may include I/O devices or be connected to an I/O device, such as a display, to provide indication to the user of whether they are validated.

The zone computer 150a also includes multiple interfaces 620, wired or wireless, for communicating with other devices. For example, interface 620a may be a Wi-Fi interface or a cellular interface or may include both interfaces. 620b may include a Bluetooth or Bluetooth 4.0 or BLE interface. In one example, message exchanges between the mobile device 130a and the zone computer 150a are done through a Bluetooth but other interfaces may be used. 620c may be a NFC interface, but the mobile device 130a may have both BLE and NFC interfaces. The interfaces 620b and 620c are short-distance communication interfaces. A short-distance communication interface may have a communication range of a few meters (e.g., Bluetooth or BLE) or a few centimeters (e.g., NFC). The range is generally much shorter than Wi-Fi or cellular. The short-distance communication interface may cover a sub-location or a sub-location and its adjacent sub-location. The zone computer 150a may connect via a network interface of interfaces 620 to a server backend via the Internet or another wide area network or a local area network for validation, which may include fare payment.

Figure 7:
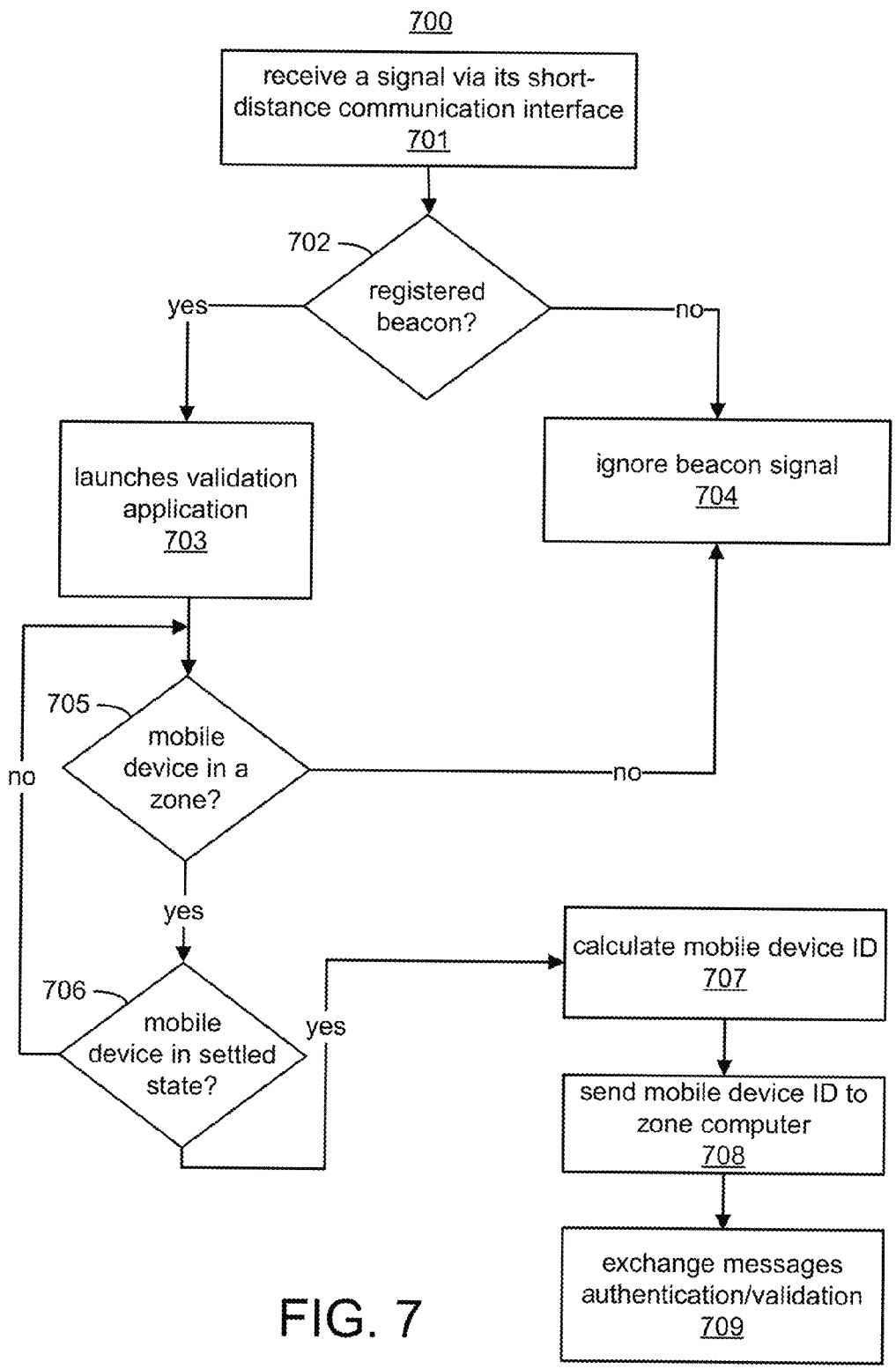
FIGS. 7 and 8 illustrate flowcharts of methods performed by a mobile device and zone computer in the a secure short-distance-based communication and validation system, according to examples of the present disclosure.

FIG. 7 shows a flowchart of a method 700 that may be performed by a mobile device, such as the mobile device 130a, in the system 100. At 701, the mobile device 130a receives a signal via its short-distance communication interface, such as a Bluetooth, BLE or Bluetooth 4.0, interface. At 702, the mobile device 130a determines whether it is from at least one registered beacon. For example, the OS 603 running on the mobile device 130a determines whether the unique IDs, like UUID, major ID and/or minor ID received from a beacon or a plurality of beacons matches one or more registered unique IDs. At 703, if the beacon or beacons are registered beacons, the OS 603 launches the validation application 132a. If not, the received signals are ignored at 704.

At 705, the validation application 132a determines whether the mobile device 130a is in the validation area or in a particular zone of the validation area 101. This may be determined by triangulation-based detection or tap-based detection as described above. If the mobile device 130a is determined to be in the validation area 101 or in a particular zone, a determination is made as to whether the mobile device 130a is in a settled state at 706. The settled state may be identified if the mobile device 130a is stationary for a predetermined amount of time while in the zone. Determining whether the mobile device 130a is stationary may be determined from the motion sensors 620 shown in FIG. 6. In another example, the settled state is identified if the mobile device 130a is stationary for a predetermined amount of time while in the zone and while the zone is moving, such as if the zone is in a vehicle. In another example, the settled state is identified if the mobile device 130a is in movement while in the zone and while the zone is moving, such as if the zone is in a vehicle. If the mobile device 130a is not in a settled state, 705 is repeated. If the mobile device 130a is in a settled state, a unique mobile device ID is calculated based on information received from the one or more beacons at 707. The mobile device ID may be unique to the mobile device 130a and the current location of the mobile device 130a when the mobile device ID is calculated and subsequently transmitted to the zone computer 150a at 708. At 709, messages are exchanged with the zone computer 150a for the zone in a secure manner using one or more encryption keys via a short-distance communication interface (e.g., Bluetooth) to authenticate and validate a user associated with the mobile device and to allow access to the restricted area through the sub-location if the user is validated. At 702, if the mobile device 130a is not determined to be in the validation area 101, then at 704, the signals from the beacons are ignored.

Figure 8:
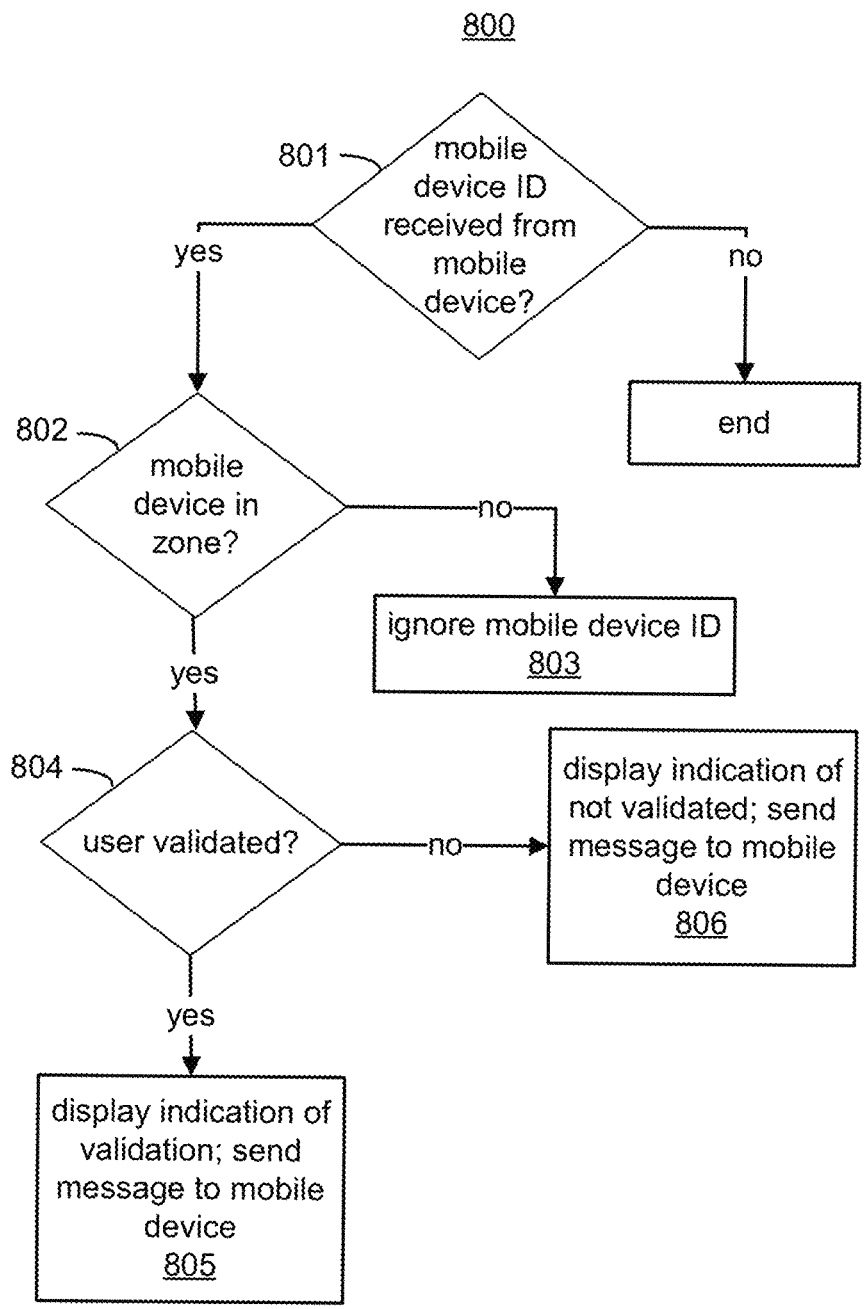

FIG. 8 shows a flowchart of a method 800 that may be performed by a zone computer, such as the zone computer 150a, in the system 100. At 801, the zone computer 150a determines whether a mobile device ID is received in a message from the mobile device 130a via a short-distance communication interface of the zone computer 150a. If the mobile device ID is received, the zone computer 150a determines whether the mobile device 130a is in zone 1 for the zone computer 150a at 802. If tap-based detection was used, the zone computer 150a can assume the mobile device is in zone 1. Alternatively, the zone computer 150a may scan for all Bluetooth mobile devices in range looking for devices which expose certain services/characteristics, and determines a mobile device is in zone 1 based on the signal strength, dwell time, accuracy, distance, azimuth, angle, etc.

At 803, if the mobile device 130a is not determined to be in zone 1, the message is ignored. If the mobile device 130a is determined to be in zone 1, the zone computer 150a determines whether a user associated with the mobile device 130a is validated to access the restricted area at 804. At 805, the zone computer 150a sends a message to the mobile device 130a that the user is validated if the user is determined to be validated. Otherwise, at 806, a message is sent indicating validation failure. Validation results may also be displayed on display.

Figure 9:
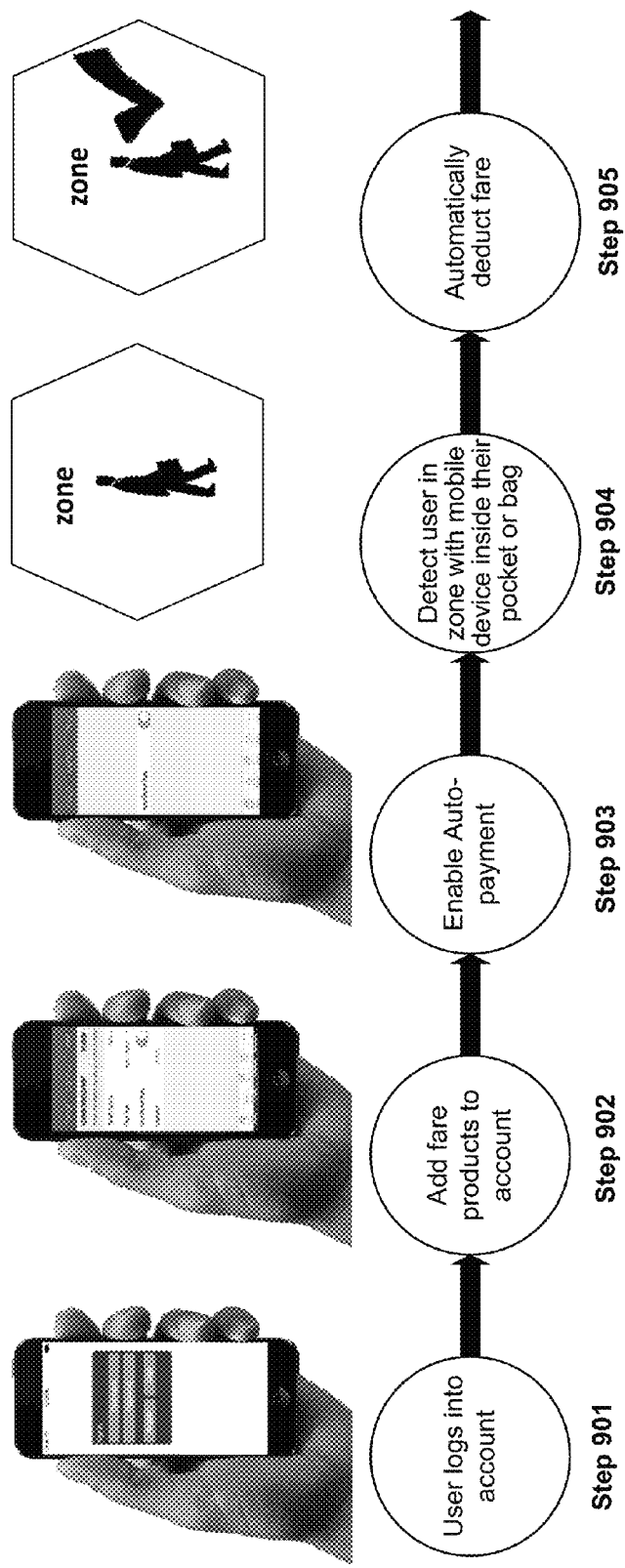
FIG. 9 illustrates a method for fare-based validation, according to an example of the present disclosure.

FIG. 9 illustrates a method 900 for fare-based access control using the system 100. For example, validation and approval or denying entry or exit to a restricted area is based fare payment. The validation area 101 for example provides a fare-based service, such as a subway or train station that charges a fare to passengers that ride the train. Also, the validation application 132a includes modules to enable fare payment.

At 901, a user logs into their account. The user may have to create an account if they don't have one. The validation application 132a provides a graphical user interface on the mobile device 130a to receive a login ID and password and send the information to a backend server to log the user into their account. At 902, the validation application 132a adds fare products to the account based on user selections. Fare products includes any goods or services for which the user is authorizing payment. At 903, the validation application 132a enables auto-payment of the selected fare products in response to user input. At 904, the mobile device is detected in a zone or sub-location. Detection of the mobile device 130a to invoke validation is described in detail above. Validation is the payment of the fare in this example. The mobile device 130a may remain in the user's pocket or bag to invoke validation, which is more convenient for the user. At 905, the user's account is automatically deducted and the fare gate opens. The amount deducted is based on the fare scheme used by the transit entity, which may be based on distance, day pass, etc. In one example, a single fare is charged regardless of distance traveled. In another example, distance traveled or number of stops is determined to calculate the fare and the fare is deducted. To determine the distance traveled or number of stops traveled (e.g., when the user is a passenger on the train) the validation application on the mobile device determines when the user leaves the train or leaves a train station. For example, the mobile device of the user may receive a signal via the short-distance communication interface of the mobile device from a beacon at an exit to the train station or near the exit of the vehicle that indicates the user has left the train or train station. The signal may identify the train station, so the validation application can determine the train station where the user got on the train and the train station where the user got off the train in order to calculate the fare.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A secure short-distance-based communication and validation system to validate users in a validation area, the system comprising:
   a beacon disposed in each zone of a plurality of zones in a validation area; and
   a plurality of computers, wherein each computer of the plurality of computers is associated with a different zone and each computer comprises:
   a processor; and
   a short-distance communication interface to communicate with a mobile device at a location within a zone of the associated computer,
   wherein each computer is to
   broadcast a beacon identifying signal via the beacon disposed within the associated zone, wherein the beacon identifying signal is different for each zone of the plurality of zones,
   wherein to validate a user associated with the mobile device for a first zone of the plurality of zones, the computer associated with the first zone is to:
   receive a first mobile device identifier transmitted from the mobile device via the short-distance communication interface, wherein the first mobile device identifier is based on the beacon identifying signal for the first zone;
   determine, based on the broadcasted beacon identifying signal and the received first mobile device identifier, whether the mobile device is in the first zone;
   determine, in response to determining the mobile device is in the first zone, whether the user associated with the mobile device is validated for the first zone, and
   in response to determining the user is validated for the first zone, sending a signal to the mobile device indicating the user is validated for the first zone, and
   wherein to validate the user for a second zone of the plurality of zones, the computer associated with the second zone is to:
   receive a mobile signal from the mobile device, the mobile signal including a second mobile device identifier transmitted from the mobile device via the short-distance communication interface, wherein the second mobile device identifier is based on the beacon identifying signal for the second zone;
   ignore the mobile signal in response to a determination that the user validation for the first zone is applicable to the second zone; and
   validate the user for the second zone in response to a determination that the user validation for the first zone is not applicable to the second zone.

2. The secure short-distance-based communication and validation system of claim 1, wherein to validate the user for the first zone and the second zone, the mobile device is determined to be in a settled state in the validation area, wherein the validation area is mobile, and wherein the mobile device is determined to be in the settled state in the validation area if the mobile device is determined to be stationary for a predetermined period of time while the validation area is moving.

3. The secure short-distance-based communication and validation system of claim 1, wherein the validation area is a vehicle, and to validate the user, a fare for riding in the vehicle is deducted from an account of the user.

4. The secure short-distance-based communication and validation system of claim 1, wherein the mobile device identifier is unique to the mobile device and a current location of the mobile device when the mobile device transmits the mobile device identifier to the computer of the zone where the mobile device is located.

5. The secure short-distance-based communication and validation system of claim 1, wherein the first and second computers use one or more encryption keys to securely transmit messages to the mobile device in response to determining the mobile device is in the zone of the associated computer.

6. The secure short-distance-based communication and validation system of claim 5, wherein to securely transmit the messages to the mobile device, the computers encrypt the messages with the one or more encryption keys.

7. The secure short-distance-based communication and validation system of claim 1, wherein each of the computers includes a network interface, and communicates with a backend server via the network interface to validate the user.

8. A mobile device comprising:
at least one short-distance communication interface to receive a beacon identifier (ID) from at least one beacon in a validation area;
a non-transitory data storage storing an operating system and machine readable instructions; and
a motion sensor measuring the motion of the mobile device;
a processor executing the operating system and the machine readable instructions, wherein the operating system determines whether the received beacon ID is a registered beacon ID, and in response to determining the beacon ID is a registered beacon ID, the processor determines whether the mobile device is in a zone of a validation area, wherein the validation area includes a plurality of zones, and determines whether the mobile device is in a settled state based on measurements from the motion sensor;
in response to determining the mobile device is in the zone and the mobile device is in the settled state, the processor calculates a mobile device unique identifier for the mobile device based on the beacon ID, wherein the mobile device unique identifier is only valid for the mobile device and the zone where the mobile device is currently located;
the processor engages in secure communication with a zone computer for the zone using the mobile device unique identifier via the at least one short-distance communication interface to validate a user associated with the mobile device;
the processor receives an indication from the zone computer that the user is validated for the zone of the validation area;
the processor stores the indication of the validation of the user for the zone;
the processor receives a second signal from at least one of beacons in a second zone in the validation area;
the processor ignores the second signal based on the stored indication in response to a determination that the received indication of the validation of the user for the zone is applicable to the second zone; and
the processor validates the user for the second zone if the received indication of validation of the user for the zone is not applicable to the second zone.

9. The mobile device of claim 8, wherein the validation area is mobile, and the mobile device is determined to be in the settled state in the validation area if the mobile device is determined to be stationary for a predetermined period of time while the validation area is moving.

10. The mobile device of claim 8, wherein the validation area is a vehicle, and to validate the user, a fare for riding in the vehicle is deducted from an account of the user.

11. The mobile device of claim 8, wherein the mobile device unique identifier is calculated based on at least one of a signal strength of a received signal from the at least one beacon, a major ID of the beacon ID, and a minor ID of the beacon ID.

12. The mobile device of claim 8, wherein the mobile device includes an input/output (I/O) device, and the processor receives a message from the zone computer indicating whether the user is validated, and generates an indication of whether the user is validated through the I/O device.

13. The mobile device of claim 8, wherein to determine whether the mobile device is at the zone, the processor is to tap-based detection by sending a near-field signal to the zone computer and determining whether a near-field response signal is received from the zone computer.

14. The mobile device of claim 8, wherein to determine whether the mobile device is at the zone, the processor executes triangulation-based detection by receiving signals from three beacons associated with the zone and determining from the received signals whether the mobile device is in the zone.

15. A mobile device validation method comprising:
receiving, by a mobile device, a signal from at least one beacon disposed in a zone of a validation area, wherein the signal is received via at least one short-distance communication interface of the mobile device;
determining, by the mobile device, whether the mobile device is in the validation area based on the received signal;
determining, by the mobile device, whether the mobile device is in a settled state based on measurements from a motion sensor of the mobile device; and
in response to determining the mobile device is in the validation area and in a settled state, the mobile device exchanging messages with a computer for the validation area via the at least one short-distance communication interface to validate a user associated with the mobile device;
receiving, by the mobile device, an indication from the computer that the user is validated for a zone of the validation area;
storing the indication of the validation of the user for the zone;
receiving a second signal from at least one of beacons in a second zone in the validation area;
ignoring the second signal based on the stored indication in response to a determination that the received indication of the validation of the user for the zone is applicable to the second zone; and
validating the user for the second zone if the received validation is not applicable to the second zone.

16. The method of claim 15, wherein the validation area is mobile, and determining whether the mobile device is in a settled state in the validation area comprises:

determining, by the mobile device, whether the mobile device is stationary while the validation area is moving.

17. The method of claim 16, wherein determining whether the mobile device is stationary while the validation area is moving comprises:
   determining, by the mobile device, whether the mobile device is stationary for a predetermined period of time while the validation area is moving.

18. The method of claim 15, wherein the exchanging of the messages are to cause a deducting of a fare payment from an account of the user according to fare payment rules.

19. The method of claim 18, wherein the validation area is in a vehicle and the fare payment is for riding in the vehicle to a destination, the method comprising:
   receiving, by the mobile device, another signal via the at least one short-distance communication interface of the mobile device from another beacon associated with a second computer indicating the mobile device is leaving the vehicle or a station, wherein an amount of the fare payment is determined from a location where the mobile device exited the vehicle or the station.

20. The method of claim 18, wherein the validation area is in a vehicle and the fare payment is for riding in the vehicle to a destination, and a predetermined fare is deducted from an account of the user in response to receiving a validation message from the mobile device.

21. A method to validate users in a validation area, the method comprising:
   broadcasting, by a computer associated with a zone within the validation area, a beacon identifying signal via at least one beacon disposed within the zone;
   receiving, by a mobile device, the beacon identifying signal;
   determining, by the mobile device, based on the beacon identifying signal, whether the mobile device is in the zone associated with the computer and whether the mobile device is in a settled state based on sensor measurements measuring motion of the mobile device;
   in response to the determining by the mobile device that the mobile device is in the zone associated with the computer, and in response to the determining by the mobile device that the mobile device is in a settled state, the mobile device transmitting a message including a mobile device identifier to the computer, the mobile device identifier being based on the beacon identifying signal and a location of the mobile device;
   in response to receiving the message transmitted from the mobile device, and determining that the mobile device is in the zone associated with the computer, determining whether a user associated with the mobile device is validated for the zone; and
   communicating a result of the validation determination to the mobile device via a short distance interface, wherein determining whether the user is validated and communicating the result of the validation determination comprises securely exchanging messages with the mobile device using the mobile device identifier;
   storing an indication of the validation of the user for the zone;
   receiving a second signal from at least one of beacons in a second zone in the validation area;
   ignoring the second signal based on the stored indication in response to a determination that the indication of the validation is applicable to the second zone; and
   validating the user for the second zone if the indication of the validation is not applicable to the second zone.

22. The method of claim 21, wherein the validation area is in a vehicle, and to validate the user, a fare for riding in the vehicle is deducted from an account of the user, and determining whether the user is validated comprises:
   determining whether the fare was deducted from the user account or determining the user account is enabled for automatically debiting the fare.

23. The secure short-distance-based communication and validation system of claim 1, wherein the plurality of zones in the validation area are in close proximity, and a broadcast range, power, and frequency of the beacon in each zone of the plurality of zones is tuned per an environment of the validation area.

24. The mobile device validation method of claim 15, wherein the zones within the validation area are proximately close zones in the validation area, and a broadcast range, power, and frequency of each of the at least one beacon in each zone of the plurality of proximately close zones is tuned per an environment of the validation area.

25. The method of claim 21, wherein the zones within the validation area are proximately close zones in the validation area, and a broadcast range, power, and frequency of each of the at least one beacon in each zone of the plurality of proximately close zones is tuned per an environment of the validation area.

* * * * *